United States Patent [19]

Flowers

[11] Patent Number: 4,618,124
[45] Date of Patent: Oct. 21, 1986

[54] METHOD OF INSTALLING CONDUIT

[76] Inventor: Thomas Flowers, 1069 E. York, Flint, Mich. 48505

[21] Appl. No.: 730,913

[22] Filed: May 6, 1985

Related U.S. Application Data

[62] Division of Ser. No. 491,154, May 4, 1983, Pat. No. 4,527,775.

[51] Int. Cl.⁴ ............................................. E21C 29/16
[52] U.S. Cl. .......................................... 254/134.3 FT
[58] Field of Search ............... 254/134.3 R, 134.3 FT, 254/134.5; 269/8; 15/104.3 S N; 166/65 M; 294/65.5; 335/207, 306

[56] References Cited

U.S. PATENT DOCUMENTS

| | | | |
|---|---|---|---|
| 1,978,957 | 10/1934 | Pardiech | 254/134.3 FT |
| 2,812,921 | 11/1957 | Leith | 254/134.5 |
| 2,993,395 | 7/1961 | Bohn | 269/8 |
| 3,078,073 | 2/1963 | Zizzo | 254/134.3 R |
| 3,291,449 | 12/1966 | Hughes | 254/134.3 FT |
| 3,971,543 | 7/1976 | Shanahan | 254/134.3 R |

FOREIGN PATENT DOCUMENTS 629868  9/1949  United Kingdom ...... 254/134.3 FT Primary Examiner—Robert C. Watson
Attorney, Agent, or Firm—Stephenson and Boller

[57] ABSTRACT

Method for installing conduit in a confined wall space are disclosed. A tape is introduced into the confined space behind the wall and is extended to an outlet point by moving a tool along the exterior wall surface. The tool has an electromagnet which attracts a metal roller on the end of the tape, drawing the roller against the interior wall surface. The tool has rollers, or wheels, allowing it to roll on the exterior wall surface, and hence the extension of the tape is by means of combined roller action on both surfaces of the wall. At the outlet, conduit is attached to the tape and is pulled into the confined space by retracting the tape. Retraction of the tape may be accomplished by a drum onto which the tape is wound.

4 Claims, 4 Drawing Figures

U.S. Patent    Oct. 21, 1986    4,618,124
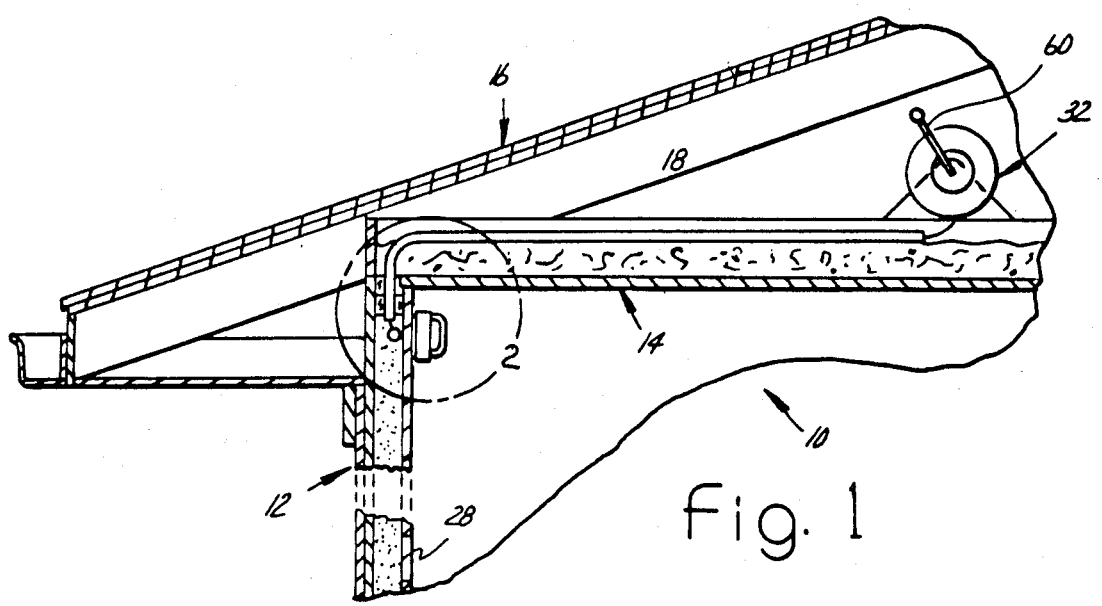
fig. 1
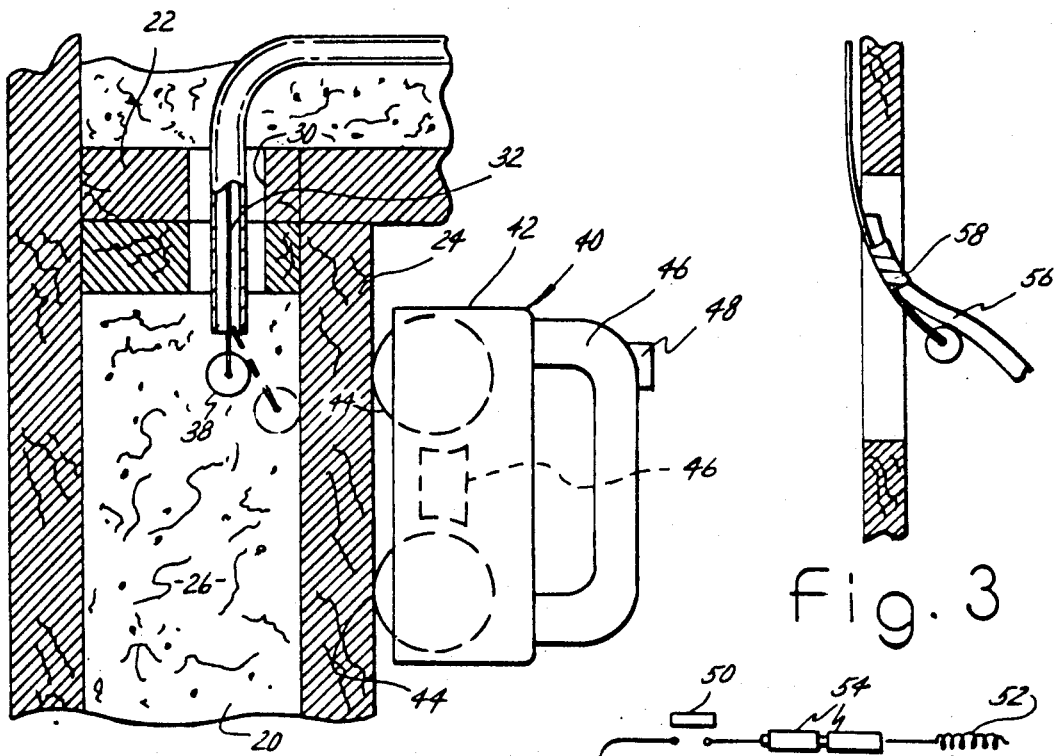
fig. 2
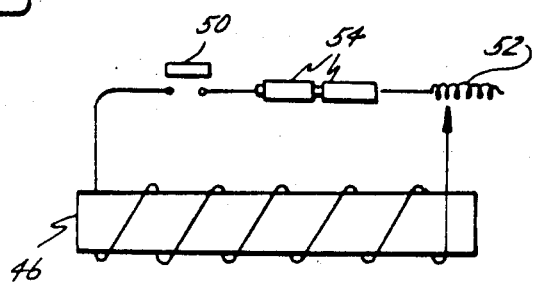
fig. 3
fig. 4

METHOD OF INSTALLING CONDUIT

CROSS REFERENCE TO RELATED APPLICATION

This application is a division of application Ser. No. 491,154, filed May 4, 1983, now U.S. Pat. No. 4,527,775.

BACKGROUND AND SUMMARY OF THE INVENTION

This invention relates to method and apparatus for installing conduit, particularly electrical conduit, in a confined space behind a wall in a building or dwelling.

In new buildings or dwellings, electrical conduits are usually placed in the wall framework before the wall panels are placed over the framework. Accordingly, the installation of conduits at this stage of construction poses no particular problem because the space is readily accessible. However, in completed dwellings in which the wall panels have been put into place, the installation of electrical conduit becomes a difficult task because the conduit must be routed into blind confined spaces. Where such walls have glass fibre insulation, or other filler, in them the task becomes especially difficult, if not impossible.

The present invention is directed to a new and improved method and apparatus for installing conduit in confined spaces behind walls which are already in place, and which can be used where insulation, or other filler, occupies the confined spaces in the framework behind the walls. With the present invention, conduit can be installed in such spaces with efficiency thereby promoting increased productivity in installing such conduit, and helping to avoid frustration during such procedures.

Briefly, according to the preferred embodiment of the present invention, a tape, commonly known as a "fish tape", is used in conjunction with a magnet. Access openings are provided to the confined space, and at one access opening one end of the fish tape is introduced into the confined space. This end of the fish tape contains a roller which is attracted by an electromagnet which is placed on the exterior of the wall. The electromagnet is mounted on a wheeled carriage. When the electromagnet is energized, it attracts the roller on the end of the tape, and when the carriage is moved toward another access opening, it rolls the roller along the interior of the wall to the other point of access. At the second point of access the conduit which is to be installed behind the wall is secured to the end of the fish tape containing the roller. Then the fish tape is withdrawn, thereby pulling the conduit through the confined space. Withdrawal of the tape, and hence pulling of the conduit through the confined space is accomplished by the means of a reel, or drum, on which the tape is wound, the drum being disposed on the exterior of the confined space near the first point of access.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 1 is a fragmentary vertical sectional view through a building, and having portions broken away, illustrating the principles of the present invention.

FIG. 2 is an enlarged fragmentary view taken in circle 2 of FIG. 1.

FIG. 3 is a fragmentary view taken generally in circle 3 of FIG. 1, but enlarged and illustrating a step in the method of the invention.

FIG. 4 is a schematic diagram illustrating structural details of a portion of the apparatus which is used in the practice of the invention.

DESCRIPTION OF THE PREFERRED EMBODIMENT

FIG. 1 illustrates a portion of a building or dwelling 10 and principles of the present invention in installing electrical conduit in said building or dwelling. The building comprises an illustrative construction having a vertical wall section 12, a ceiling wall section 14 and an overlying roof section 16. The construction defines a room space 18 and an attic space 19.

For purposes of illustrating principles of the invention, the conduit is to be installed in the vertical wall section 12 to extend between the room and attic spaces. Typical vertical wall construction comprises a series of horizontally spaced apart vertically extending studs 20 which are bridged along the top by means of a header 22. The illustrated header 22 comprises two separate header members joined together. An interior wall panel 24, which by way of example may be drywall or lath and plaster, is secured onto the stud and header framework. The construction defines a confined space behind wall panel 24 and in typical construction this space is often occupied by an insulating medium or other type of filler material 26 between the vertical studs.

In order to initiate the procedure for installing the conduit in wall section 12, it is necessary to provide access openings into the confined space behind the wall panel 24. One point of access is provided by a cutout 28 in wall 24. Typically cutout 28 will be a rectangular shape corresponding to the rectangular shape of an electrical receptical box which is to be mounted in the wall section at the opening 28. In the illustrated construction, another access opening 30 is provided through header 22. The latter access opening 30 comprises aligned bores in the two header members. A particularly suitable way for forming the bores 30 is by means of the boring tool disclosed in my co-pending application Ser. No. 231,469, filed Feb. 4, 1981. The boring tool disclosed in that application is operable in the limited attic space where the roof meets the ceiling to permit the operator to be located in the attic space and to create the vertical bores through the headers.

Once the bores have been completed, one end of the tape 32 is introduced into the confined area behind wall 24 through the bores 30. Tape 32, commonly referred to as a "fish tape", is preferrably coiled into a reel, or drum, 34 which can be suitably positioned in the attic space at a distance spaced horizontally from wall section 12 so that the coil can be conveniently reeled onto and off of the drum. A sheath, or guide 36 may also be provided for guiding the fish tape into the bores 30.

The end of the fish tape which is introduced into the confined space behind wall 24 comprises a magnetic means thereon. In the illustrative construction the magnetic means takes the form of a roller 38 which is suitably mounted on the end of tape 32 for rotation about its own axis 39. Thus, the solid line position shown in FIG. 2 is illustrative of a typical disposition of the tape when the roller just has been introduced into the confined space behind wall 24. If there is insulation or other material in the way, the fish tape and/or sheath can be manipulated to compact or compress the insulation to a certain limited extent.

Also associated with the invention is a magnetic tool 40. The magnetic tool 40 comprises a carriage 42 containing a plurality of roller wheels 44 via which the tool may be rolled along the room surface of wall panel 24. Suitably mounted on the carriage 42 is an electromagnet 46. The electromagnet is selectively energizable to create a corresponding magnetic attractive force which is effective through wall panel 24 to draw the roller 38 against the surface of wall 24 which is on the confined space. Thus, the broken line position of roller 38 illustrated in FIG. 2 represents a position which the roller assumes when the tool is suitably positioned near the top of the wall and the electromagnet is energized.

Tool 40 further comprises a handle 48 which allows the tool to be manually grasped by an operator and rolled along wall 24. A control switch 50 is associated with the tool to energize and deenergize the electromagnet. Also associated with the tool is a rheostat adjustment 52 which allows the intensity of the magnetic force to be set to a desired level. FIG. 4 schematically illustrates the construction and arrangement of electromagnet 46, switch 50, and rheostat 52. These are shown in a series circuit in association with a suitable power source, for example, DC batteries 54. Alternatively, the unit could be powered by means of AC power and a plug-in cord connected to the circuit in place of the batteries.

When the switch 50 is closed, electric current flows from the power source to the electromagnet to create the magnetic force. With the magnet energized, the operator rolls the tool along wall 24 toward opening 28. The magnetic force acting on roller 38 is sufficient to keep the roller drawn against the wall to cause it to follow tool 40 rolling along the wall toward opening 28. The rolling action, both of roller 38 and of the wheels 44, facilitates the movement of both the tool 40 as well as the extension of the tape into the confined space behind the wall panel. The roller rolls in the confined space between the insulation filling the space and the wall surface and in so doing can push the insulation out of the way.

The operator continues to roll the tool until the roller 38 has been brought to the point of access 28. The roller and the end of the tape can then be grasped by the operator, and as shown in FIG. 3, a conduit 56 which is to be installed in the wall can be attached to the tape, for example, by means of a piece of adhesive tape 58 wrapped around the conduit 56 and the tape 32.

With the conduit 56 secured in this way to the tape 32, drum 34 is operated to roll up the tape and thereby withdraw it from the confined space behind wall 24 through bores 30. For this purpose, the drum may include a crank and handle 60, allowing it to be manually rotated. The drum is journaled on a frame which allows it to be suitably supported on the ceiling joists at a position where it may be conveniently operated. As the tape is being retracted, the conduit 56 is drawn through opening 28 and into the confined space of the vertical wall panel 24. As the end of the tape is withdrawn from bores 30, the attached end of the conduit is also drawn through the bores. The conduit has sufficient length so as to extend between the bores 30 and the opening 28 and to provide for the electrical connections which are required. The adhesive tape 58 may now be removed to disconnect the end of the fish tape from the conduit. This completes the installation procedure for the conduit behind the wall panel 24.

The rolling actions of the roller 38 and the roller wheels 44, in addition to facilitating installation of the conduit, provide further benefits. For one, the rolling action of the wheels 44 on the room wall surface can be performed without marring the wall's appearance, provided that the wheels are made of a suitable material such as plastic. By making roller 38 of a magnetically responsive material, it is ensured that the roller is drawn against the inside wall surface. Other constructions are, of course, possible. While axle-mounted wheels for 44 and 38 are shown, they could be caster-mounted, swivel mounted, or in the nature of spherical balls suitably captured in sockets.

While the principles of the invention have been illustrated with respect to installing conduits in a vertical wall between an opening in the interior wall surface and bores in the header of the wall section, it will be appreciated that the principles may be applied to installing conduit in other than this type of wall between these types of access openings. Moreover, while the invention is particularly addressed to solving the problem of installing conduit in a wall containing insulation filling the interior spaces of the wall framework, it may be used where these hollow spaces are not so obstructed. The illustrated constructions of the fish tape, and the electromagnet tool are also illustrative for purposes of illustrating the invention. While a preferred embodiment has been disclosed, it will be appreciated that the principles of the invention are applicable to other embodiments.

What is claimed is:

1. A method for installing conduit in a confined space behind a wall between points of access to the confined space which comprises: introducing into the confined space at one point of access, one end of a tape having a magnetically responsive roller means on said one end; said tape being coiled on a drum disposed exteriorly of the confined space near said one point of access, magnetically attracting said roller means toward said wall by an attracting magnet positioned on the side of said wall opposite the confined space; moving said magnet along said wall to another point of access and thereby, through the attractive force of said magnet on said roller means causing said roller means to roll on the surface of said wall which is on the interior of the confined space also drawing the tape through the confined space to said another point of access, said tape having sufficient length to extend between said two points of access; securing conduit to said one end of said tape at said another point of access; and turning said drum to withdraw said tape from the confined space via said one point of access, thereby to draw the conduit from said another point of access to said one point of access.

2. The method called for in claim 1 wherein said magnet is moved along said wall by rolling the magnet on a wheeled carriage having a handle for manual grasping, the magnet being rolled by an individual user grasping said handle and rolling the wheeled carraige along said wall.

3. The method called for in claim 2 in which said magnet is an electromagnet and including a switch for operating the electromagnet and a rheostat for adjusting the magnet intensity, said switch being manually actuated by the individual user to produce a desired intensity of attractive force.

4. The method called for in claim 1 in which the wall is generally vertically disposed and in which said magnet is moved vertically along the wall, said two points of access being vertically spaced apart.

* * * * *